United States Patent
Jager

(10) Patent No.: US 6,330,433 B1
(45) Date of Patent: *Dec. 11, 2001

(54) ANTENNA SELECTION CONTROL CIRCUITRY

(75) Inventor: Michael David Jager, Surrey (GB)

(73) Assignee: Nokia Mobile Phones Limited, Salo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/823,858

(22) Filed: Mar. 25, 1997

(30) Foreign Application Priority Data

Mar. 29, 1996 (GB) .................................. 9606779

(51) Int. Cl.⁷ ...................................... H04B 7/00
(52) U.S. Cl. ............ 455/277.2; 455/135; 455/277.1
(58) Field of Search .................. 455/133, 134, 455/135, 272, 273, 277.1, 277.2, 278.1, 571, 575; 343/702

(56) References Cited

U.S. PATENT DOCUMENTS

| | | | |
|---|---|---|---|
| 4,633,519 | | 12/1986 | Gotoh et al. ............... 455/277 |
| 4,977,616 | * | 12/1990 | Linder et al. ............... 455/277.2 |
| 5,138,329 | * | 8/1992 | Saarnimo et al. ............ 343/702 |
| 5,241,701 | * | 8/1993 | Andoh ..................... 455/277.1 |
| 5,276,920 | | 1/1994 | Kuisma .................... 455/101 |
| 5,369,801 | * | 11/1994 | Wadin et al. .............. 455/277.1 |
| 5,499,397 | * | 3/1996 | Wadin et al. .............. 455/277.1 |
| 5,603,107 | * | 2/1997 | Gottfried et al. .......... 455/277.2 |
| 5,634,204 | * | 5/1997 | Takahashi et al. ......... 455/277.1 |
| 5,634,206 | * | 5/1997 | Reed et al. ............... 455/277.2 |
| 5,692,019 | * | 11/1997 | Chang et al. .............. 455/277.1 |

FOREIGN PATENT DOCUMENTS

| | | | |
|---|---|---|---|
| 0 318 665 A2 | 6/1989 | (EP) . | |
| 0 452 289 A1 | 10/1991 | (EP) . | |
| 0 454 585 A1 | 10/1991 | (EP) . | |
| 0 620 657 A1 | 10/1994 | (EP) . | |
| 94/08404 | * 4/1994 | (WO) | ............... H04B/7/08 |
| 94/13068 | * 6/1994 | (WO) | ............... H04B/7/10 |

* cited by examiner

Primary Examiner—Nay Maung
Assistant Examiner—Quochien B. Vuong
(74) Attorney, Agent, or Firm—Perman & Green, LLP

(57) ABSTRACT

Apparatus and method are described for selecting for subsequent use an antenna from a plurality of antennas. The selection is biased in favor of the antenna most likely to receive subsequent signals having best signal quality. In a preferred embodiment the signal quality comprises received signal strength.

44 Claims, 7 Drawing Sheets

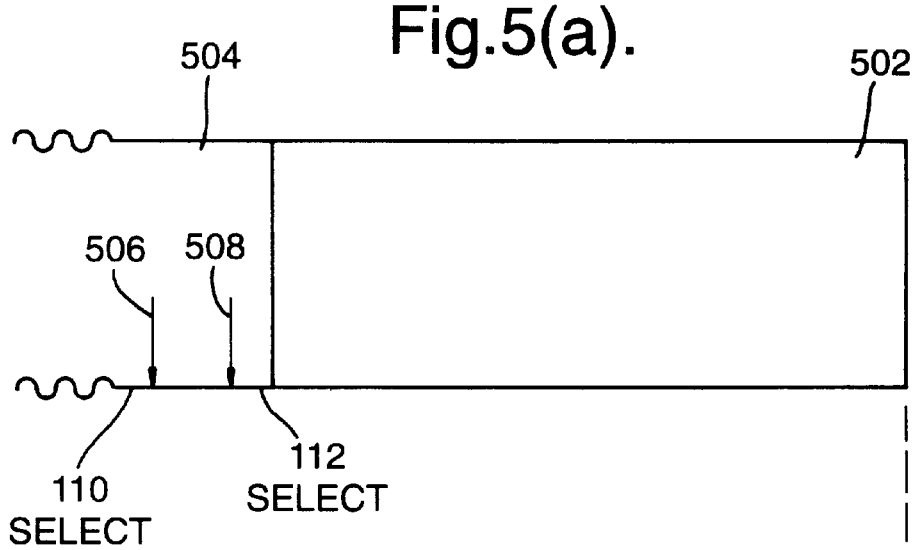
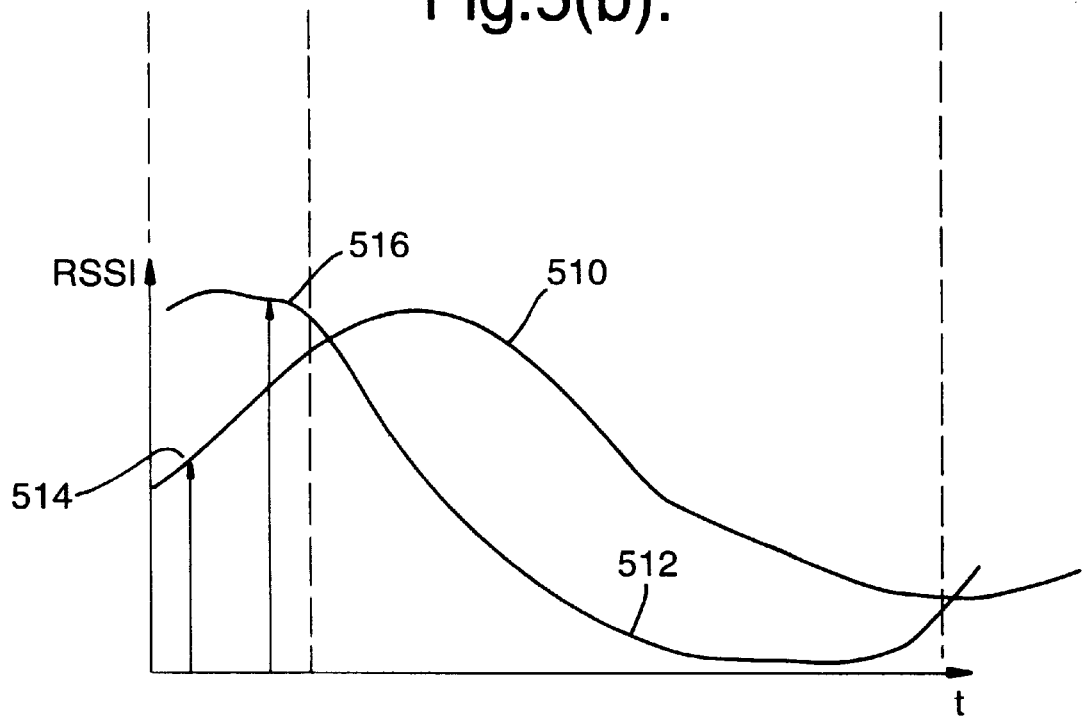

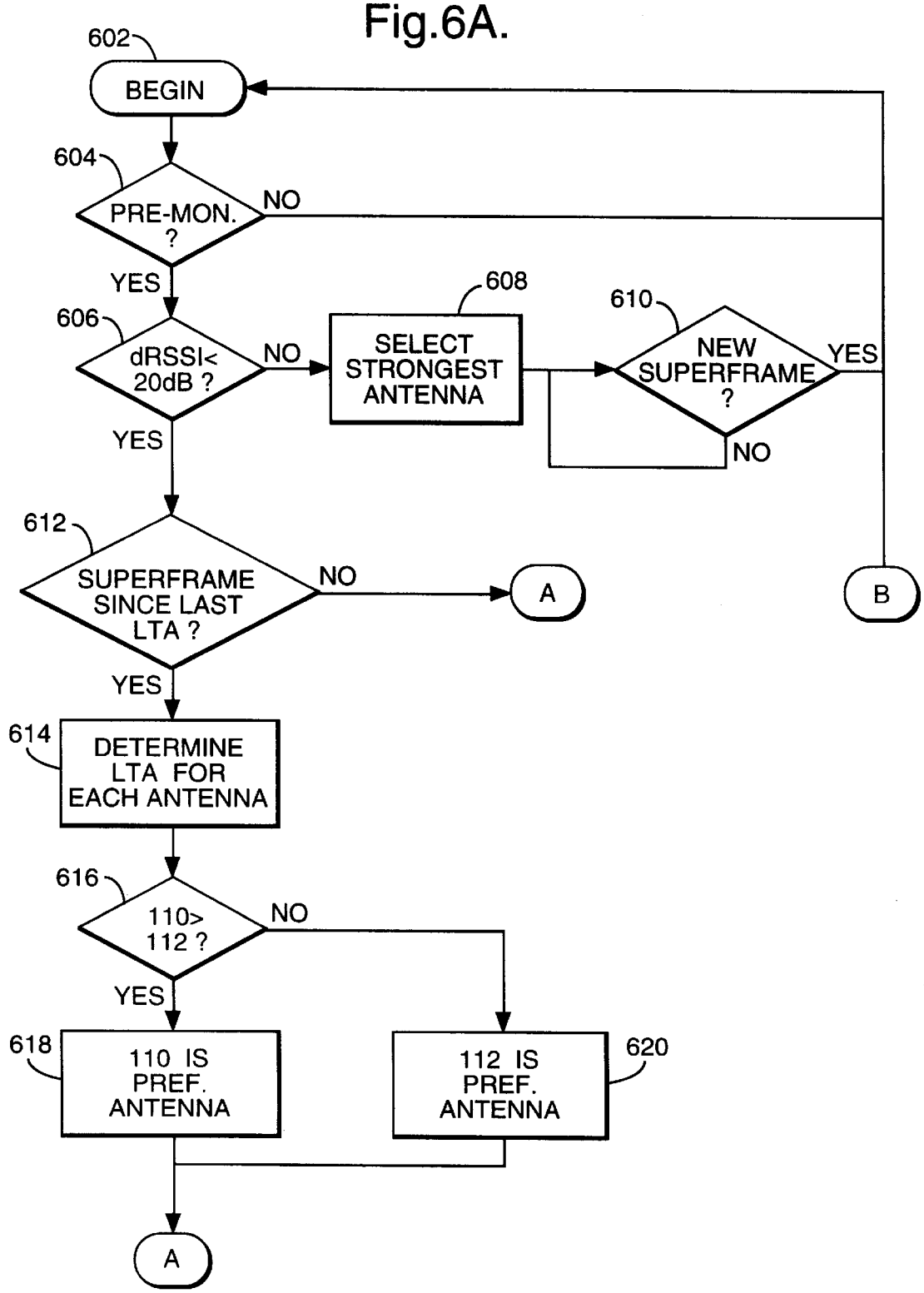

ANTENNA SELECTION CONTROL CIRCUITRY

FIELD OF INVENTION

The present invention relates to apparatus and a method for controlling the selection of an antenna for a receiver operable for at least two antennas. In particular, but not exclusively, the present invention relates to antenna selection control circuitry for a communication system such as a radio telephone network.

BACKGROUND TO INVENTION

Existing communication systems suffer from a number of effects which act to degrade the quality of communication between a transmitting unit and a receiving unit within the communication system. In particular, in a radio telephone network for example, which comprises a plurality of mobile stations or radio telephones communicating with a base station connected to other base stations in the radio telephone network, both the radio telephone and the base station are relatively close to ground level. Since the base station and radio telephone are close to ground level obstacles such as buildings, walls, cars and people inhibit direct line of sight communication between them, especially in urban areas. Thus, they typically communicate between each other by reflected or diffracted radio wave signals. Due to the multiple reflections and diffractions the r.f. power received by a radio telephone or a base station is at a much lower level than would be expected from the inverse square law if direct line of sight communication was possible. Typically, the power loss is of the form $d^{-a}$ where d is the distance between the transmitting and receiving stations and a lies between 3 and 4. This power loss is known as path loss.

The problem of path loss has been addressed in known radio telephone systems by the base stations monitoring the strength of signals received from various radio telephones communicating therewith (to form a received signal strength indicator RSSI signal), and from time to time issuing a request over the air for an individual radio telephone to increase or decrease its transmitting power. The radio telephone responds by adjusting the gain of its transmitting amplifier which is typically under microprocessor control. Generally, the amplifier is operable at one of a plurality of predetermined output power levels which are selected automatically in response to the request from the base station for a change in the level of the output power. Typically, the power levels are defined in the radio telephone system specification. For each power level a nominal value is specified together with a permitted tolerance range.

In addition to path loss, also known as normal fading, there is another form of fading known as Rayleigh fading. This type of fading is a short term fading and is characterised by rapid variations in the r.f. power level of a signal received by a radio telephone or base station. It is caused by the multiple signal paths arising from the reflections and diffractions forming a quasi-stationary standing wave pattern with nulls at approximately half wavelength intervals of the signal frequency. As a user moves through their environment, they move through the nulls.

The effect of the periodic nulls in received signal power due to Rayleigh fading is that transmitted data may be lost thereby introducing errors into the transmission. In order to ensure that there is sufficient integrity in the radio telephone network redundant data has to be sent such as error-correcting codes. This results in a reduced information or data handling capacity for the network. Additionally, the multiple signal paths introduce time delays between signals incident at a particular radio telephone which causes inter-symbol interference. Such symbol interference is a particular problem in communication systems having relatively high data rates, for example where 1/symbol rate >10 $\mu$s.

The problems of Rayleigh fading have been addressed by using a technique known as Slow Frequency Hopping (SFH) or Frequency Hopping. In this technique, the carrier frequency of a particular communication channel is discontinuously changed between discrete carrier frequencies of a set of defined carrier frequencies. Since the Rayleigh fading of signals at different frequencies is not the same, and becomes increasingly different as the difference between the frequencies increases, frequency hopping for a particular communication channel substantially reduces the effects of Rayleigh fading for that communication channel, effectively transforming errors due to Rayleigh fading into widely spread random errors. Another advantage is that co-channel interference from other cells is reduced.

Such a technique is known from the GSM system for cellular radio telephony, where the sequence of data bursts making up a particular communication channel or Traffic Channel (TCH) are cyclically assigned to different frequencies by the base station handling that communication channel. Additionally, a technique known as interleaving is employed in the GSM system. This involves jumbling up data to be transmitted such that normally adjacent groups of data are transmitted at different times, and de-interleaving the transmitted signal at the receiver.

In a system having relatively low data rates, for example >25k symbol/s, the periodic variation in the signal strength due to Rayleigh fading is the main problem. Such a system is typically referred to as suffering from non-frequency selective or "flat" Rayleigh fading. An example of such a system is the Japanese RCR radio telephone network.

It is known to utilize two or more antennas in a mobile terminal to reduce the effects of flat Rayleigh fading. This is commonly referred to as antenna diversity.

Respective antennas are selected for use based on a comparison of various criteria indicative of the quality of signals received by the antennas. Typically, the selection of an antenna is based on a comparison of received signal strength indication (RSSI) signal from at least two antennas. First, the antenna receiving the signal of greatest strength is selected, and then if the signal from the selected antenna falls below a threshold another antenna is selected. It is also known to measure the slope of RSSI variation in order to predict subsequent received signal levels.

BRIEF SUMMARY OF THE INVENTION

In a first aspect of the invention there is provided antenna selection apparatus for a receiver selectively operable with a first and a second antenna, comprising measurement means for measuring average received signal quality for respective first and second antennas, and selection means for selecting a first or second antenna for subsequent use based on average received signal quality for the first and second antennas wherein the selection means is biased in favour of the first or second antenna having a predetermined likelihood of receiving subsequent signals having best signal quality.

In a second aspect of the invention there is provided a method for selecting an antenna from a plurality of antennas for a receiver operable with the antennas, comprising measuring average received signal quality for respective antennas, and biasing selection of an antenna for subsequent use in favour of an antenna having a predetermined likelihood of receiving subsequent signals having the best signal quality.

An advantage of the present invention is that antenna diversity performance for a receiver may be improved, since an antenna is selected when it has the greatest chance of receiving the best signal quality. This reduces the likelihood of having to switch antennas later whilst receiving information, and thereby avoids clicks and other disturbing interferences in received information due to phase changes caused by such switching. Furthermore, this improvement may be achieved with relatively simple averaging of signals. Additionally, a change in the typical quality of a received signal from an antenna can be taken into account and diversity biased towards that antenna. An example of such an instance is when a radio telephone is operated in an in-car mode, and external car mounted antennas are input to the radio telephone. In such circumstances, since both antennas are external, they typically have the same gain or sensitivity to signals as each other. If selection was biased towards one of the external car mounted antennas, then possibly higher quality signals received by the other car antenna would not be utilised.

Embodiments in accordance with the invention are contrary to the usual assumption that both antennas of an antenna diversity system have equal sensitivity. It is recognised that, even if both antennas have the same gain, because one is typically external and the other internal and/or placed in different locations to the other, the effective sensitivity or gain for the antenna is different. Moreover, due to the size constraints of radio telephones it is likely that an internal antenna is smaller than an external antenna, e.g. a helical antenna, and have a gain of 6 to 10 decibels lower than that of the external antenna. Additionally, as a user of a mobile terminal, for example, moves the environment changes and this may affect the effective gain. The effective gain of an antenna may be indicated by the RSSI value for the antenna.

Since one antenna, typically an external antenna, usually receives signals of greater strength than the other, usually internal, antenna, simple switching between antenna based solely on instantaneous RSSI, or some other signal quality measure, can result in an antenna being selected which is likely to receive signals of lower strength or poorer signal quality. Thus, lower quality signals may be input to a receiver than might actually be available from another antenna.

In a preferred embodiment the first antenna comprises an inherent likelihood of receiving subsequent signals having the best signal quality. This typically occurs when the first antenna is disposed outside the housing of a communication apparatus e.g. radio telephone, and the second antenna is disposed inside the housing.

The antenna selection apparatus may further comprise a comparing means for comparing long term average received signal quality for respective first and second antenna, and designating the first or second antenna having the best long term average received signal quality as the antenna having the likelihood of receiving subsequent signals having the best signal quality.

This has the advantage that biasing may be optimised for changing signal environments, and need not be fixed for a particular antenna.

Preferably, an antenna of the first and second antennas receiving the greatest average signal quality is selected for subsequent use when the difference between average received signal quality exceeds a threshold. This effectively disables any form of modified antenna selection, and selects the antenna receiving signals of the greatest signal quality when the signal environment is good. This avoids unnecessary processing of signals.

Suitably, the selection means is operable to select a first or second antenna in accordance with the following relationship;

NON_PREF>PREF+dSIGNAL_QUALITY * α where NON_PREF is the average signal quality received by the antenna towards which selection is not biased, PREF is the average signal quality received by the antenna to which selection is biased, dSIGNAL_QUALITY is the difference between average received signal quality for the antennas, and α is a factor. Thus, the antenna towards which selection is not biased (non-preferred antenna) is only selected if its average signal quality (NON-PREF) fulfills the foregoing condition.

Optionally, the signal quality comprises signal to noise ratio or carrier to interferer ratio.

Advantageously, the signal quality comprises received signal strength, which is a relatively simple and straightforward signal quality to measure and does not require a lot of processing.

In a particularly suitable embodiment the antenna selection apparatus is operable in a first and second mode, wherein the first mode is operable for the average received signal strength from respective first and second antennas exceeding a reference level.

The reference level is set to define a region above it in which carrier to interferer ratio effects dominate the decision as to which antenna should be selected. The reference level may be in the range 15–30 dB above the sensitivity of the receiver, e.g. the point at which the bit error rate (BER) is about 1%. At such BER levels the communication channel begins to degrade and the degradation results in audible clicks or pops.

The reference level is not limited to falling within the above range, but may be determined for a particular communication system.

In the first mode the selection means is operable to select a first or second antenna in accordance with the following relationship;

NON_PREF>PREF−dRSSI * θ in the second mode the selection means is operable to select a first or second antenna in accordance with the following relationship;

NON_PREF>PREF+dRSSI * θ where NON_PREF is the average signal strength received by the antenna towards which selection is not biased, PREF is the average signal strength received by the antenna to which selection is biased, dRSSI is the difference between average received signal strength for the antennas, and θ is a factor.

Suitably, the antenna selection apparatus may be operable for a Time Division Multiplexed (TDM) receiver adapted to receive signals in time slots of interest and time slots not of interest, wherein the measurement means and the selection means are operable during a time slot not of interest for selecting the first or second antenna for subsequent use during a time slot of interest.

BRIEF DESCRIPTION OF THE DRAWINGS

FIG. 5 shows an example of RSSI variation for diversity antennas in a TDMA system.

DETAILED DESCRIPTION OF EMBODIMENTS OF THE INVENTION

Figure 1:
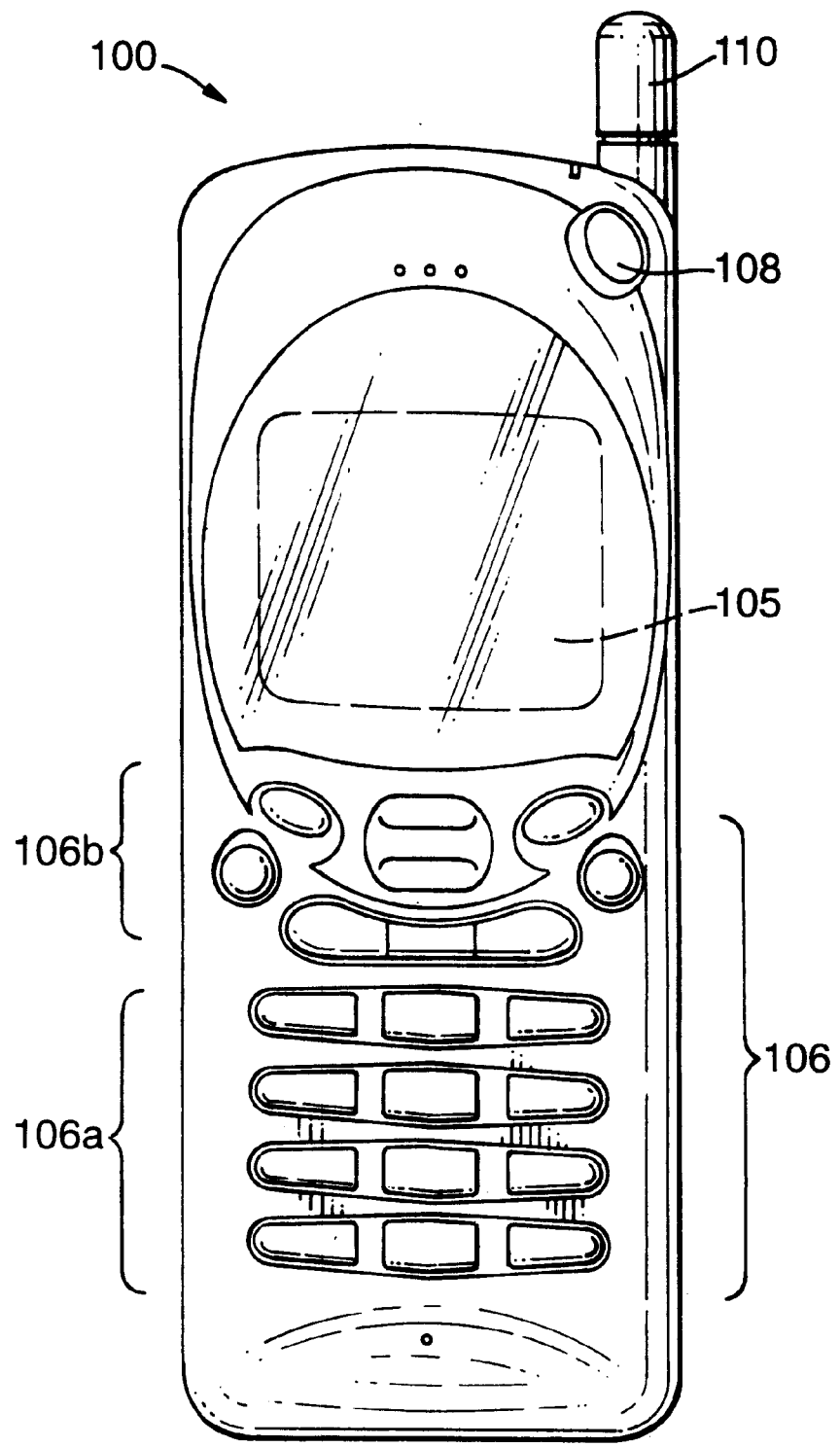
FIG. 1 shows a radio telephone suitable for use with the present invention.

Embodiments of the invention will now be described, by way of example only, and with reference to the accompanying drawings in which:

The portable radio telephone shown in FIG. 1 is a cellular telephone 100 powered by a rechargeable battery pack. The user-interface of telephone 100 comprises a display, e.g. a liquid crystal display 105, itself well-known in the art and a keypad 106 on the front of the telephone 100. The display is coupled to and regulated by the microprocessor 104 in the usual manner. The keypad 106 essentially comprises two main sets of keys, namely alpha numeric keys 106a associated with alpha numeric data especially for dialling telephone numbers, but also (optionally) for entering alphanumeric data into the telephone memories, e.g. a subscriber number index, and a set of function keys 106b for enabling various predetermined functions or operations. The telephone 100 also includes a power ON/OFF button 108, an external antenna 110, (typically a retractable antenna) and an internal antenna 112 which is typically a helical or coil antenna.

Figure 2:
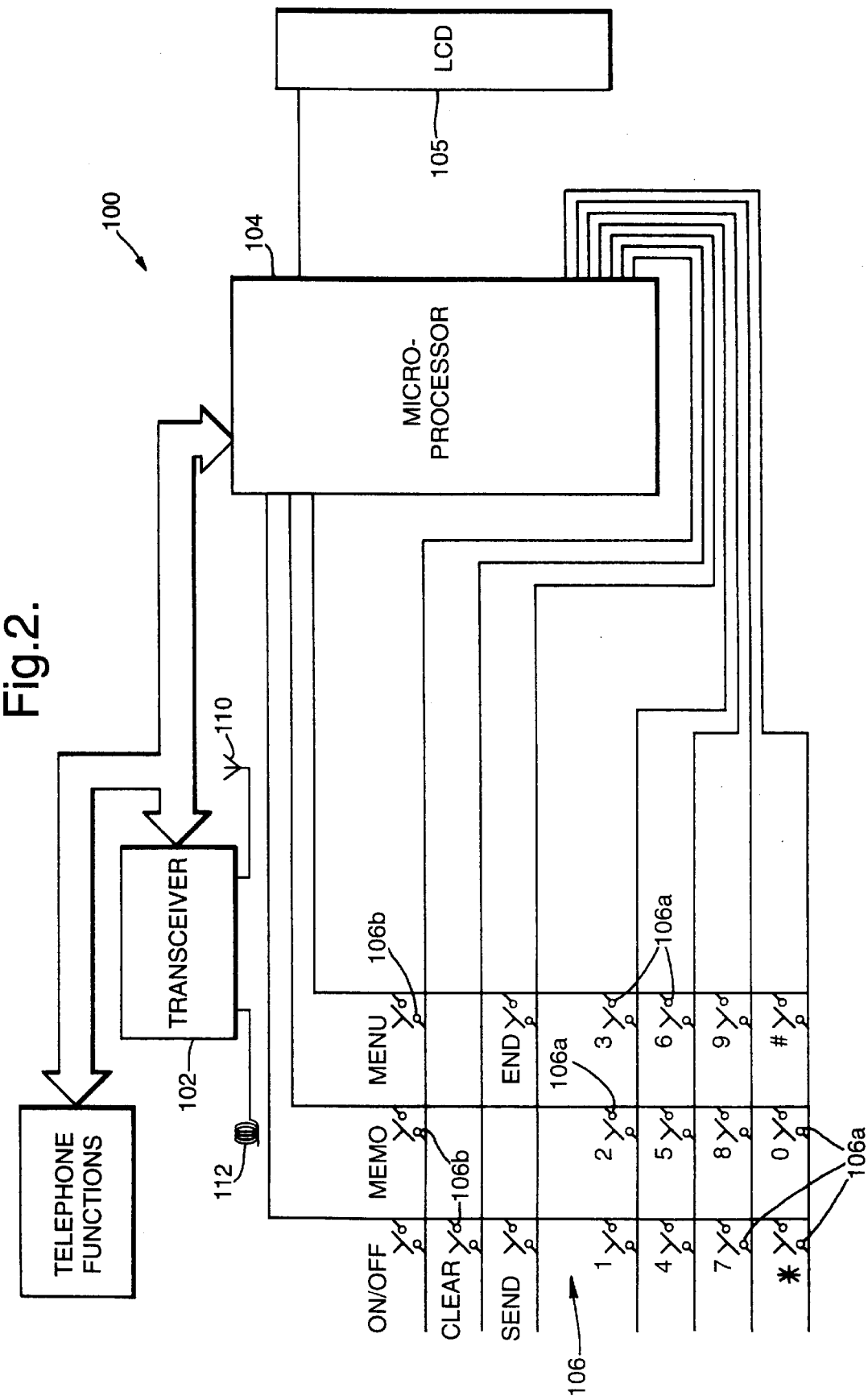
FIG. 2 is a block diagram of the radio telephone shown in FIG. 1.

The telephone 100 includes a transceiver 102 and all the other features conventionally found in a cellular telephone, as shown schematically in FIGS. 1 and 2. Since these aspects of the telephone are not directly relevant to the instant invention no further details will be given here, except to say that a single microprocessor 104 (see FIG. 2) is employed to control all the basic functions of the telephone 100 and to control the keypad and display functions. Alternatively, however, the telephone functions may be controlled by a master microcomputer, while the keypad and display functions are under the control of a separate slave microcomputer coupled to communicate with the master microcomputer.

A greater understanding of the variation of RSSI due to flat Rayleigh fading for respective diversity antennas, and the effect of the antennas having different effective sensitivity or gain may be gained from the following discussion.

FIG. 5 shows a known manner of measuring the RSSI of diversity antennas 110, 112 for a Time Division Multiple Access (TDMA) in order to determine which antenna is to be used for receiving a wanted signal. As is well known, in a TDMA system respective communication channels are assigned separate time slots during which signals for the communication channels occur. In such systems, information which is to be transmitted is split into packets. These packets are then transmitted in predetermined time slots according to the communication channel upon which they are intended to be transmitted. In a typical TDM system such as the RCR system a short time frame is established, e.g. 20 ms, comprising three time slots of 6.6 ms duration. This short time frame format is repeated substantially continuously. Each time slot within the frame format defines a communication channel. Typically, a receiver such as that shown in FIG. 3 will monitor, decode and process as appropriate information contained in time slots of interest, i.e. the communication channel, for the receiver, and receive but ignore the information contained in time slots not of interest. Typically, consecutive time frame formats are grouped together and known as superframes having a 720 ms period between them, and comprising 36 short time frames of 20 ms in length.

In FIG. 5(a) a time slot 502 for a wanted signal or channel is preceded by a time period 504 for a signal which is not of interest. However, signals occurring in time period 504 may be used to measure the RSSI of antennas 110, 112, for example at locations 506, 508 in time period 504. The RSSI values respectively measured at locations 506, 508 are then used to determine which antenna is used for receiving a wanted signal occurring in slot 502. However, as can be seen from the graph of RSSI against time which is temporally correlated with FIG. 5(a), shown in FIG. 5(b), an instantaneous measurement of RSSI in time 504 may not give an accurate prediction of the RSSI values in the wanted slot 502. The variation of RSSI for antennas 110, 112 is respectively shown by loci 510 and 512. As can be seen, a measurement 514 of RSSI for antenna 110 gives a lower value for RSSI than a measurement 516 for antenna 112. However, the RSSI 510 of signals for antenna 110 occurring in the slot 502 of interest is greater than the RSSI 512 for antenna 112.

Figure 3:
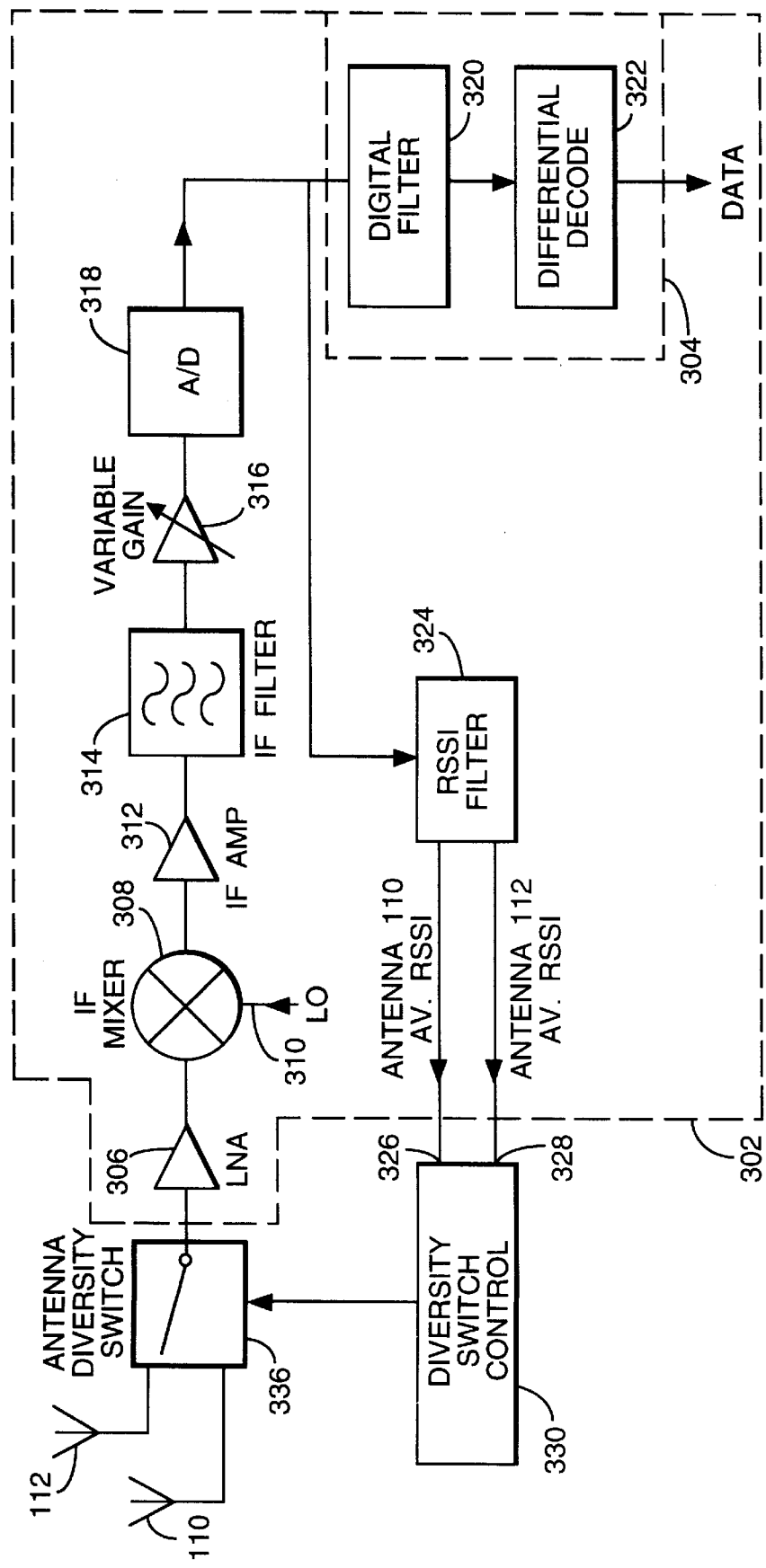
FIG. 3 is a block diagram of a receiver and antenna switching circuitry for use with the present invention.

Transceiver 102 includes a receiver 302, shown schematically in FIG. 3. In accordance with an embodiment of the invention, the receiver shown in FIG. 3 may be suitable for a Time Division Multiplexed (TDM) radio telephone system, such as the Japanese RCR system.

The receiver 302 includes a demodulator 304 which demodulates received signals and outputs the demodulated signal to other telephone functions such as the audio circuitry. The receiver 302 also comprises a low noise amplifier (LNA) 306 for receiving signals input to the receiver 302. The output of the LNA 306 is input to an Intermediate Frequency (IF) mixer 308, which also has a local oscillator 310 (LO) input. An intermediate frequency is output from the IF mixer 308 to an IF amplifier 312. The output from the IF amplifier 312 is input to an IF filter 314, and the filtered signal is input to a variable amplifier 316. The output of the amplifier 316 is sampled in an analogue to digital converter 318. The digital signal is input to demodulator 304 where it is digitally filtered in filter 320 and decoded in differential decoder 322. The output of the decoder 322 is then sent to other telephone circuitry such as the audio circuitry for reproduction as speech, and to the control circuitry of the telephone if it relates to signalling information for example.

The receiver 302 also comprises a received signal strength indicator (RSSI) filter 324. The RSSI filter 324 has the digitized received signal output from A/D converter 318 input to it. The RSSI filter 324 produces signals which are indicative of the average strength of a signal received by the receiver 302. The RSSI filter 324 produces two signals, average RSSI 326 for antenna 110 and average RSSI 328 for antenna 112, which are input to diversity switch control logic 330.

In an exemplary embodiment, the average RSSI for respective antennas may be calculated over a number for values, for example the number of values measured during a super-frame (36 values) of the RCR system. Optionally, the filter 324 may be a digital filter operable in accordance with the following relationship;

average RSSI=(1−β) old RSSI+β. current RSSI, where β is a value analogous to the time constant for an analogue filter, old RSSI is the old average value of RSSI and current RSSI is the instantaneous or most recently measured value for RSSI. Of course, the filter may also be a simple capacitor-resistor network.

The receiver 302 is coupled to the antennas 110, 112, often known as diversity antennas, via an antenna diversity switch 336, which is controlled by the diversity switch control circuitry 330 to select one or other of antennas 110, 112 from which to receive a signal.

In the described embodiment, there are two types of fading environment considered. The first is where the received signal undergoes simple fading and consequently the two antennas typically receive different signal strengths. The second is where there is an interferer present in the received signal and, since both the wanted signal and the interferer are both subject to effective antenna gain, signals from either antenna are equally good. The second situation is applicable provided the signal level is sufficiently far above the receiver sensitivity e.g. 20 dB above receiver sensitivity. The threshold may be a value other than 20 dB, but should be set such that the threshold defines the boundary for received signal strength above which the presence of an interferer begins to dominate effects on signal quality. In such situations RSSI is no longer a good indicator of signal quality.

The diversity switch control circuitry 330 shown in FIG. 3 may comprise dedicated logic, a digital signal processor (DSP) or microcomputer 104 typically provided in the radio telephone 100.

Figure 4:
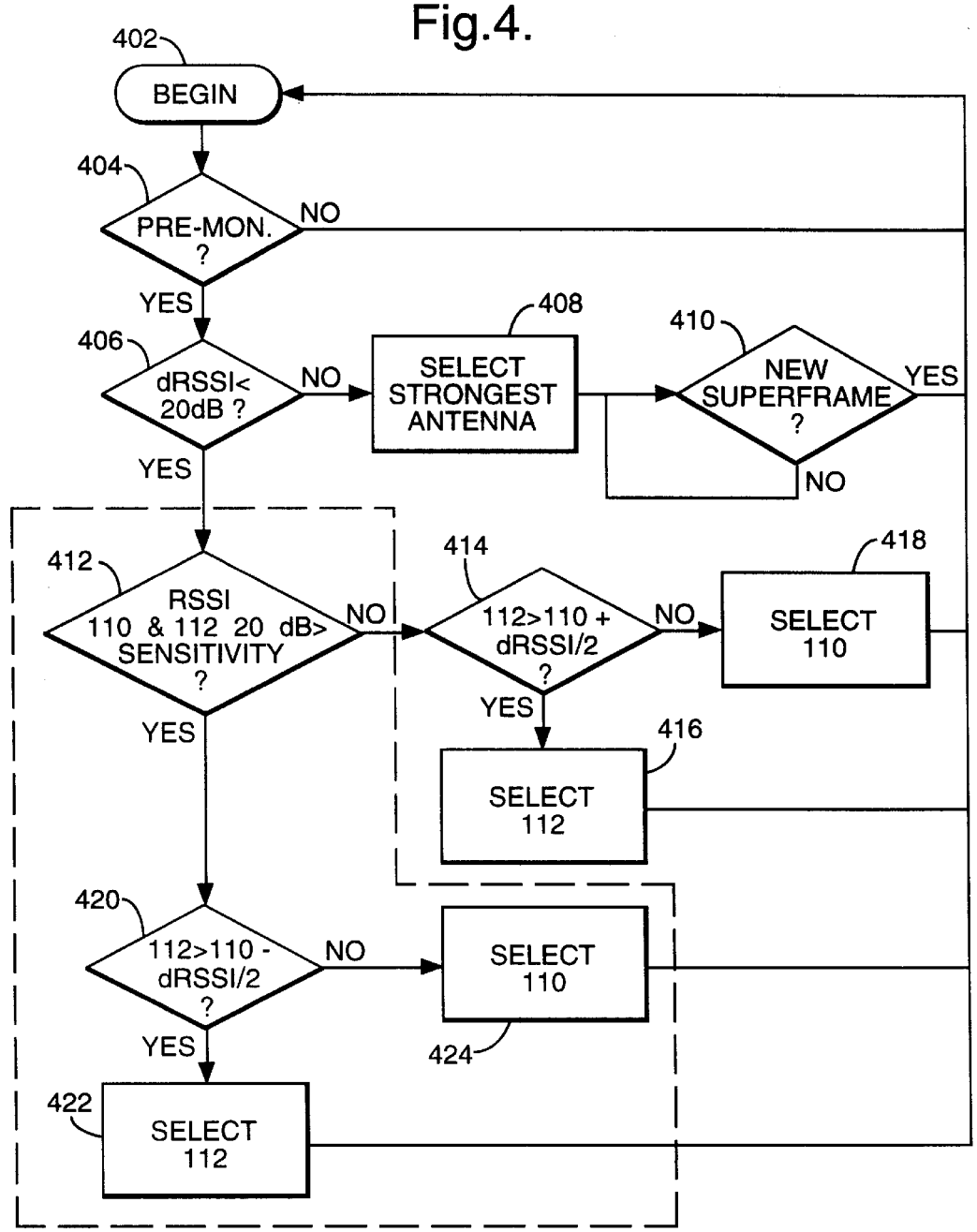
FIG. 4 shows a flow chart in accordance with an embodiment of the invention.

An antenna diversity switch controller 330 operating in accordance with a preferred embodiment of the present invention is described with reference to FIG. 4.

In this embodiment, antenna 112 is an internal antenna and is considered to have lower sensitivity than external antenna 110. Hence, selection is biased towards antenna 110.

In the described embodiment the antenna diversity switch controller 330 is operable for a TDMA system such as the Japanese RCR system.

The operation of switch controller 330 begins at step 402, and at step 404 it is determined if a PRE-MONITOR (PRE-MON) period exists. A PRE-MON period is a period of time typically immediately prior to a slot of interest during which the RSSI's of respective antennas 110, 112 may be measured, and corresponds to period 504 referred to when describing the prior art with reference to FIG. 5. If a PRE-MON period does not exist then operation of controller 330 returns to step 402 where the process begins again. If a YES result occurs at step 404, then the RSSI of each antenna 110, 112 is measured and input to the RSSI filter 324 for averaging. It is determined at step 406 if the difference between the average RSSI's (dRSSI) measure for antennas 110, 112 is less than 20 dB. If dRSSI is greater than 20 dB the antenna having the greatest average RSSI is selected for use during the time slot 502, of interest at step 408. Then, antenna diversity is disabled for a predetermined period of time, for example by waiting for the next superframe, step 410. The operation then begins again, step 402.

The test at step 406 need not be based on RSSI, but may be based on carrier to interferer ratio (C/I), signal to noise ratio, (Eb/No) or some other suitable measure of the quality of the received signal or signal environment. The nature of the test at step 406 needs to be such that it can determine to a reasonable extent that the likelihood of fading within a predetermined time, e.g. superframe, for either antenna 110, 112 will not impair the quality of a received signal.

If dRSSI was less than 20 dB, then it is determined, step 412, whether the average RSSI for the antennas 110, 112 is greater than 20 dB above the receiver sensitivity. If not then it is determined if the following inequality applies, step 414;

$$AvRSSI_{112} > AvRSSI_{110} + dRSSI/2 \qquad (1)$$

where $AvRSSI_{112}$ is the average RSSI in dB for antenna 112, $AvRSSI_{110}$ is the average RSSI in dB for antenna 110 and $dRSSI/2$ is half the difference in average RSSI in dB for antennas 110 and 112. If inequality (1) is satisfied the antenna 112, step 416, is selected for the time slot of interest and the operation begins 402 again. If it is not satisfied then antenna 110 is selected, step 418. However, if a YES result occurs at step 412 then the following inequality is applied at step 420;

$$AvRSSI_{112} > AvRSSI_{110} - dRSSI/2, \qquad (2)$$

If inequality (2) is satisfied then antenna 112 is selected at step 422, and if inequality (2) is not satisfied then antenna 110 is selected at step 424.

After antenna selection has taken place the operation of controller 330 returns to step 402 and antenna diversity selection begins again.

An antenna diversity switch controller operating in accordance with the foregoing embodiment selects the antenna which has the greatest likelihood of receiving the strongest signal during the slot of interest, based upon the average RSSI for the antennas and the nature of the fading environment in which the controller is operating.

It will be appreciated by persons of ordinary skill in the art that the thresholds at step 406 and step 412 are not limited to the specified values, but may be varied and determined by routine trial and error to accord with the requirements of a particular receiver or communication system for which the invention is utilised. Similarly, the inequalities labelled (1) and (2) are not limited to the specific values or relationships described with reference to a specific embodiment of the invention, but may also be determined by routine trial and error.

In a further embodiment in accordance with the invention, the biasing of selection towards an antenna is dependent on the received signal environment for the antenna. For example, the long term average received signal quality of antennas 110 and 112 may be determined and the antenna having the greatest long term average received signal quality designated as the preferred antenna. The selection means is then biased towards selecting the preferred antenna.

Figure 6B:
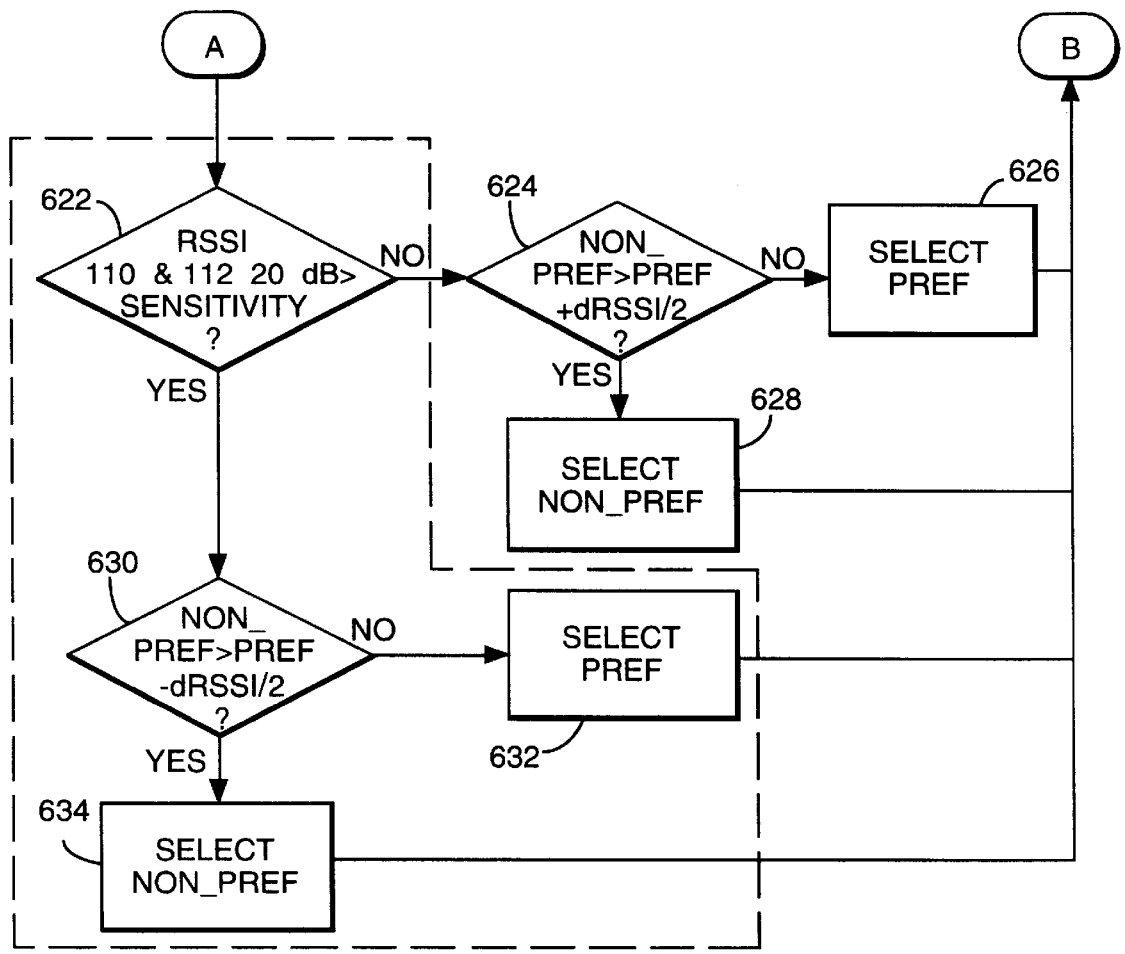
FIG. 6 shows a flow chart in accordance with a further embodiment of the invention.

FIG. 6 shows a flow chart for the operation of a controller 330 in accordance with the further embodiment of the invention.

The process begins at step 602, and at step 604 it is determined if a PRE-MONITOR period exists. If the result is NO then operation of controller 330 returns to step 602. If the result at step 604 is YES then the received signal strength for antennas 110, 112 is measured and the average received signal strength calculated. It is determined at step 606 whether or not the difference in average received signal strength between antennas 110, 112 is less than 20 dB. If NO, then the antenna having the greatest average received signal strength is selected at step 608. Then the process is halted at step 610 until the next superframe occurs. If the result at step 606 is YES then the operation proceeds to step 612 where it is determined if a superframe has elapsed since the last calculation of the long term average (LTA) received signal strength for each antenna.

If the result at step 612 is NO then the next step is step 622. If the result is YES then the LTA received signal strength is determined for each antenna at step 614. At step

616 it is determined if antenna 110 has greater LTA received signal strength than antenna 112. If YES 110 is designated the preferred antenna (PREF), and 112 the non preferred antenna (NON_PREF) at step 618, and if NO 112 is designated the preferred antenna, and 110 the non preferred antenna at step 620.

After designating preferred and non preferred antennas, the control proceeds to step 622 where it is determined, step 622 whether the RSSI for the antennas 110, 112 is greater than 20 dB above the receiver sensitivity. If not then it is determined if the following inequality applies, step 624.

$$\text{NON\_PREF} > \text{PREF} + dRSSI/2, \quad (3)$$

where NON_PREF is the average RSSI in dB for the non preferred antenna, PREF is the average RSSI in dB for the preferred antenna and dRSSI/2 is half the difference in average RSSI in dB for antennas 110 and 112. If inequality (3) is satisfied then the non preferred antenna step 628 is selected for the time slot of interest and the operation 402 begins again. If it is not satisfied then the preferred antenna is selected, step 626, for the time slot of interest. However, if a YES ,result occurs at step 622 then the following inequality is applied at step 630;

$$\text{NON\_PREF} > \text{PREF} - dRSSI/2, \quad (4)$$

If inequality (4) is satisfied then the non preferred antenna is selected at step 634, and if inequality (4) is not satisfied then the preferred antenna is selected at step 632.

After antenna selection has taken place the operation of controller 330 returns to step 602 and antenna diversity selection begins again.

An antenna diversity switch controller operating in accordance with the foregoing embodiment selects the antenna which has the greatest likelihood of receiving the strongest signal during the slot of interest, based upon the average RSSI for the antennas and the nature of the fading environment, as measured by long term average received signal strength; in which the controller is operating.

As discussed earlier, the thresholds and inequalities described above are merely examples of embodiments of the invention, and may be selected as appropriate for particular communication systems or environments.

In the above exemplary descriptions, the signal quality is received signal strength. However, the invention is also relevant to other measures of signal quality such as signal to noise ratio or carrier to interferer ratio. If such other signal quality measures are utilised then decision block 412 and 622 respectively shown in FIG. 4 and FIG. 6 are effectively removed, and the controller is only operable for blocks 414, 416, 418, and 624, 626, 628 of FIG. 4 and 6 respectively. In effect blocks 412 and 622 are replaced by blocks 414 and 624. This shown by the dotted lines in FIGS. 4 and 6.

In the described embodiments, the antenna diversity switch is disposed before the receiver section of the telephone, thereby requiring only one receiver section. Optionally, two separate receiver paths may be provided, one for each antenna. In such an embodiment the antenna diversity switch can be placed after the receivers and before the audio circuitry. The diversity switch control then can have separate instantaneous and average RSSIs inputs from both receivers, as well as separate signals indicative of signal quality. The present invention can be applied to such an embodiment to reduce needless switching between antennas and respective receivers.

It will be evident to a person skilled in the art that various modifications falling within the scope of the appended claims may be made to the described embodiment. For example, the invention may be utilised in systems other than TDMA systems for periodically selecting one of two or more antennas for use. Additionally, the inequalities (1), (2), (3) and (4) described above are merely exemplary and other values or relationships may be utilised.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What I claim is:

1. Antenna selection apparatus for a receiver selectively operable with a first and a second antenna, comprising:
   measurement means for measuring average received signal quality for respective first and second antennas; and
   selection means for selecting a first or second antenna for subsequent use based on average received signal quality for the first and second antennas;
   wherein the selection means is biased in favor of the first antenna having a predetermined likelihood of receiving subsequent signals having best signal quality, the selection means selecting one of the first or the second antennas for subsequent use based on the average received signal quality measurement of one of the antennas exceeding the average received signal quality measurement of the other of the antennas by an amount proportional to a difference between long-term average received signal qualities of the respective antennas.

2. Antenna selection apparatus according to claim 1, further comprising a comparing means for comparing long term average received signal quality for respective first and second antenna, and designating the first or second antenna having the best long term average received signal quality as the antenna having the likelihood of receiving subsequent signals having the best signal quality.

3. Antenna selection apparatus according to claim 1, wherein an antenna of the first and second antennas receiving the greatest average signal quality is selected for subsequent use when the difference between average received signal quality exceeds a threshold.

4. Antenna selection apparatus according to claim 1, wherein the signal quality comprises signal to noise ratio or carrier to interferer ratio.

5. Antenna selection apparatus according to claim 1, wherein the signal quality comprises received signal strength.

6. Antenna selection apparatus according to claim 5, operable in a first and second mode, wherein the first mode is operable for the average received signal strength from respective first and second antennas exceeding a reference level.

7. Antenna selection apparatus according to claim 1, and operable for a Time Division Multiplexed (TDM) receiver adopted to receive signals in time slots of interest and time slots not of interest, wherein the measurement means and the selection means are operable during a time slot not of interest for selecting the first or second antenna for subsequent use during a time slot of interest.

8. A radio telephone comprising a housing including antenna selection apparatus according to claim 1, wherein the first antenna is disposed outside the housing and the second antenna is disposed inside the housing.

9. Antenna selection apparatus according to claim 1, wherein the selection means obtains a first average signal quality measurement of the first antenna and a second average signal quality measurement of the second antenna from said measurement means, and derives a further quantity representative of said likelihood of the first antenna receiving subsequent signals having a better signal quality than the signals to be received subsequently by the second antenna; and the selection means is operative to select the first antenna unless a difference in average received signal quality between the first antenna and the second antenna meets a predetermined threshold, said further quantity serving as said threshold.

10. Antenna selection apparatus for a receiver selectively operable with a first and a second antenna, comprising:

measurement means for measuring average received signal quality for respective first and second antennas; and selection means for selecting a first or second antenna for subsequent use based on average received signal quality for the first and second antennas;

wherein the selection means is biased in favor of the first or second antenna having a predetermined likelihood of receiving subsequent signals having best signal quality; and the selection means is operable to select the first or second antenna in accordance with the following relationship:

$$NON\_PREF > PREF + dSIGNAL\_QUALITY * \alpha$$

where NON_PREF is the average signal quality received by the antenna towards which selection is not biased, PREF is the average signal quality received by the antenna to which selection is biased, dSIGNAL_QUALITY is the difference between average received signal quality for the antennas, and $\alpha$ is a factor.

11. Antenna selection apparatus for a receiver selectively operable with a first and a second antenna, comprising:

measurement means for measuring average received signal quality for respective first and second antennas; and selection means for selecting a first or second antenna for subsequent use based on average received signal quality for the first and second antennas;

wherein the selection means is biased in favour of the first or second antenna having a predetermined likelihood of receiving subsequent signals having best signal quality;

the signal quality comprises received signal strength, the apparatus is operable in a first and second mode, wherein the first mode is operable for the average received signal strength from respective first and second antennas exceeding a reference level; and in the first mode the selection means is operable to select the first or second antenna in accordance with the following relationship:

$$NON\_PREF > PREF - dRSSI * \theta$$

where NON_PREF is the average signal strength received by the antenna towards which selection is not biased, PREF is the average signal strength received by the antenna to which selection is biased, dRSSI is the difference between average received signal strength for the antennas, and is a factor.

12. Antenna selection apparatus for a receiver selectively operable with a first and a second antenna, comprising:

measurement means for measuring average received signal quality for respective first and second antennas; and selection means for selecting a first or second antenna for subsequent use based on average received signal quality for the first and second antennas;

wherein the selection means is biased in favour of the first or second antenna having a predetermined likelihood of receiving subsequent signals having best signal quality;

the signal quality comprises received signal strength, the apparatus is operable in a first and second mode, wherein the first mode is operable for the average received signal strength from respective first and second antennas exceeding a reference level; and in the second mode the selection means is operable to select a first or second antenna in accordance with the following relationship:

$$NON\_PREF > PREF + dRSSI * \theta$$

where NON_PREF is the average signal strength received by the antenna towards which selection is not biased, PREF is the average signal strength received by the antenna to which selection is biased, DRSSI is the difference between average received signal strength for the antennas, and $\theta$ is a factor.

13. A method for selecting an antenna from a plurality of antennas for a receiver operable with the antennas, comprising:

measuring average received signal quality for respective antennas;

selecting one of the antennas for subsequent use based on the average received signal quality measurement of one of the antennas exceeding the average received signal quality measurement of the other of the antennas by an amount proportional to a difference between long-term average received signal qualities of the respective antennas; and biasing selection of an antenna for subsequent use in favor of an antenna having a predetermined likelihood of receiving subsequent signals having the best signal quality.

14. A method according to claim 13, further comprising comparing long term average received signal quality for respective antennas and designating an antenna having the best long term average received signal quality as the antenna having the likelihood of receiving subsequent signals having the best signal quality.

15. A method according to claim 13, comprising selecting an antenna receiving the greatest average signal quality for subsequent use when the difference between average received signal quality exceeds a threshold.

16. A method according to claim 13, wherein the signal quality comprises signal to noise ratio or carrier to interferer ratio.

17. A method according to claim 13, wherein the signal quality comprises received signal strength.

18. A method according to claim 17, operable in a first or second mode, and operating in a first mode when the average received signal strength from respective antennas exceeds a reference level.

19. A method according to 13, and operable for a Time Division Multiplexed (TDM) receiver adopted to receive signals in time slots of interest and time slots not of interest, comprising measuring average received signal quality and selecting an antenna during a time slot not of interest.

20. A method according to claim 13, wherein the measuring obtains a first average signal quality measurement of a first antenna and a second average signal quality measurement of a second antenna of the plurality of antennas, the method further comprising a step of deriving a further quantity representative of said likelihood of the first antenna receiving subsequent signals having a better signal quality than the signals to be received subsequently by the second antenna; and the biasing is operative to select the first antenna unless a difference in average received signal quality between the first antenna and the second antenna meets a predetermined threshold, said further quantity serving as said threshold.

21. A method for selecting an antenna from a plurality of antennas for a receiver operable with the antennas, comprising:

measuring average received signal quality for respective antennas;

biasing selection of an antenna for subsequent use in favor of an antenna having a predetermined likelihood of receiving subsequent signals having the best signal quality; and selecting a first or second antenna in accordance with the following relationship:

NON_PREF>PREF+dSIGNAL_QUALITY*α where NON_PREF is the average signal quality received by the antenna towards which selection is not biased, PREF is the average signal quality received by the antenna to which selection is biased, dSIGNAL_QUALITY is the difference between average received signal quality for the antennas, and α is a factor.

22. A method for selecting an antenna from a plurality of antennas for a receiver operable with the antennas, comprising:

measuring average received signal quality for respective antennas;

biasing selection of an antenna for subsequent use in favor of an antenna having a predetermined likelihood of receiving subsequent signals having the best signal quality;

wherein the signal quality comprises received signal strength, the method is operable in a first or second mode, there being a step of operating in a first mode when the average received signal strength from respective antennas exceeds a reference level; the method further comprising in the first mode selecting a first or second antenna in accordance with the following relationship:

NON_PREF>PREF−dRSSI*θ where NON_PREF is the average signal strength received by the antenna towards which selection is not biased, PREF is the average signal strength received by the antenna to which selection is biased, dRSSI is the difference between average received signal strength for the antennas, and θ is a factor.

23. A method for selecting an antenna from a plurality of antennas for a receiver operable with the antennas, comprising:

measuring average received signal quality for respective antennas;

biasing selection of an antenna for subsequent use in favor of an antenna having a predetermined likelihood of receiving subsequent signals having the best signal quality;

wherein the signal quality comprises received signal strength, the method is operable in a first or second mode, there being a step of operating in a first mode when the average received signal strength from respective antennas exceeds a reference level; the method further comprising in the second mode selecting a first or second antenna in accordance with the following relationship:

NON_PREF>PREF+dRSSI*θ where NON_PREF is the average signal strength received by the antenna towards which selection is not biased, PREF is the average signal strength received by the antenna to which selection is biased, dRSSI is the difference between average received signal strength for the antennas, and θ is a factor.

24. Antenna selection apparatus for a receiver selectively operable with a first and a second antenna, comprising:

measurement means for measuring average received signal quality for respective first and second antennas; and selection means for selecting a first or second antenna for subsequent use based on average received signal quality for the first and second antennas;

wherein the selection means is biased in favor of a first one of the antennas having a predetermined likelihood of receiving subsequent signals having best signal quality, the selection means selecting one of the first or the second antennas for subsequent use based on the average received signal quality measurement of one of the antennas exceeding the average received signal quality measurement of the other of the antennas by an amount proportional to a difference between long-term average received signal qualities of the respective antennas.

25. Antenna selection apparatus according to claim 24, wherein the first antenna comprises an inherent likelihood of receiving subsequent signals having the best signal quality.

26. Antenna selection apparatus according to claim 24, wherein the selection means obtains a first average signal quality measurement of the first antenna and a second average signal quality measurement of the second antenna from said measurement means, and derives a further quantity representative of said likelihood of the first antenna receiving subsequent signals having a better signal quality than the signals to be received subsequently by the second antenna; and the selection means is operative to select the first antenna unless a difference in average received signal quality between the first antenna and the second antenna meets a predetermined threshold, said further quantity serving as said threshold.

27. Antenna selection apparatus for a receiver selectively operable with a first and a second antenna, comprising:

measurement means for measuring average received signal quality for respective first and second antennas; and selection means for selecting a first or second antenna for subsequent use based on average received signal quality for the first and second antennas;

wherein the selection means is biased in favor of the first or second antenna having a predetermined likelihood of receiving subsequent signals having best signal quality; and the selection means is operative to determine a difference between average received signal strength of each of the first and the second antennas, to obtain a comparison by comparing the difference with a reference, and to base a selection decision on the value of the comparison, the selection means selecting one of the first or the second antennas for subsequent use based on the average received sign al quality measurement of one of the antennas exceeding the average received signal quality measurement of the other of the antennas by an amount proportional to a difference between long-term average received signal qualities of the respective antennas.

28. Antenna selection apparatus according to claim 27, wherein said reference represents said likelihood of the first antenna receiving subsequent signals having a better signal quality than the signals to be received subsequently by the second antenna; and the selection means is operative to select the first antenna unless said difference exceeds said reference.

29. A method for selecting an antenna from a plurality of antennas for a receiver operable with the antennas, comprising:

measuring average received signal quality for respective antennas;

biasing selection of an antenna for subsequent use in favor of an antenna having a predetermined likelihood of receiving subsequent signals having the best signal quality; and selecting one of said antennas by determining a difference between average received signal strength of each of the plurality of antennas, obtaining a comparison by comparing the difference with a reference, and basing a selection decision on the value of the comparison, the selecting being based on the average received signal quality measurement of one of the antennas exceeding the average received signal quality measurement of the other of the antennas by an amount proportional to a difference between long-term overage received signal qualities of the respective antennas.

30. A method according to claim 29, wherein said reference represents said likelihood of a first of the antennas receiving subsequent signals having a better signal quality than the signals to be received subsequently by a second of the antennas; and the selection means is operative to select the first antenna unless said difference exceeds said reference.

31. Antenna selection apparatus for a receiver selectively operable with a first antenna and a second antenna, the first antenna having a predetermined likelihood of receiving subsequent signals having best signal quality, the antenna selection apparatus comprising:

measurement means for measuring average received signal quality from respectively the first antenna and the second antenna; and selection means for selecting the first antenna or the second antenna for subsequent use, wherein the selection means is operative to select the first antenna unless a difference in average received signal quality between the first antenna and the second antenna meets a predetermined threshold, the selection means selecting one of the first or the second antennas for subsequent use based on the average received signal quality measurement of one of the antennas exceeding the average received signal quality measurement of the other of the antennas by an amount proportional to a difference between long-term overage received signal qualities of the respective antennas.

32. Antenna selection apparatus according to claim 31, wherein the selection means obtains a first average signal quality measurement of the first antenna and a second average signal quality measurement of the second antenna from said measurement means, and derives a further quantity representative of said likelihood of the first antenna receiving subsequent signals with a better signal quality than the signals to be received subsequently by the second antenna, said further quantity serving as said threshold.

33. Antenna selection apparatus for a receiver selectively operable with a first and a second antenna, comprising:

measurement means for measuring average received signal quality for respective ones of the first and the second antennas;

means for determining long-term average received signal quality for respective ones of the first and the second antennas; and selection means for selecting one of the first or the second antennas for subsequent use based in part on the average received signal quality measurements and In part on the determined long-term average received signal quality, the selection means selecting one of the first or the second antennas for subsequent use based on the average received signal quality measurement of one of the antennas exceeding the average received signal quality measurement of the other of the antennas by an amount proportional to a difference between long-term average received signal qualities of the respective antennas;

wherein the selection means Is biased in favor of the antenna currently having the best determined long-term overage received signal quality.

34. Antenna selection apparatus according to claim 33, wherein the antenna receiving the greatest average signal quality is selected for subsequent use when the difference between average received signal quality exceeds a threshold.

35. Antenna selection apparatus according to claim 33, and operable for a time division multiplexed (TDM) receiver adapted to receive signals and time slots of interest and time slots not of interest, wherein the measurement means and the selection means are operable during a time slot not of interest for selecting the first or the second of the antennas for subsequent use during a time slot of interest.

36. A radiotelephone comprising a housing and including antenna selection apparatus according to claim 33, wherein the first antenna is disposed outside the housing and the second antenna is disposed inside the housing.

37. Antenna selection apparatus for a receiver selectively operable with a first and a second antenna, comprising:

measurement means for measuring average received signal quality for respective ones of the first and the second antennas;

means for determining long-term average received signal quality for respective ones of the first and the second antennas;

selection means for selecting one of the first or the second antennas for subsequent use based in part on the average received signal quality measurements and in part on the determined long-term average received signal quality;

wherein the selection means is biased in favor of the antenna currently having the best determined long-term average received signal quality; and the selection means is operable to select a first or a second of said antennas in a first mode in accordance with the following relationship:

$$\mathrm{NON\_PREF} > \mathrm{PREF} + \mathrm{dSIGNAL\_QUALITY} * \alpha$$

and in a mode in accordance with the following relationship:

$$NON\_PREF > PREF - dSIGNAL\_QUALITY * \alpha$$

where NON_PREF is the long-term average signal quality received by the antenna towards which selection is not biased, PREF is the long-term average signal quality received by the antenna to which selection is biased, dSIGNAL_QUALITY is the difference between average received signal quality for the antennas, and $\alpha$ is a factor.

38. Antenna selection apparatus according to claim 37, wherein the first mode is chosen if the average received signal quality of both of the antennas is greater than a predetermined threshold above the sensitivity of the receiver, and the second mode is chosen if the average received signal quality of both of the antennas is less than the predetermined threshold above the sensitivity of the receiver.

39. A method for selecting an antenna from a plurality of antennas for a receiver selectively operable with the antennas, comprising the steps of:
measuring average received signal quality for respective ones of the antennas;
determining long-term average received signal quality for respective ones of the antennas; and
selecting one of the antennas for subsequent use based in part on the average received signal quality measurements and in part on the determined long term average received signal quality, the selecting being based on the average received signal quality measurement of one of the antennas exceeding the average received signal quality measurement of another of the antennas by an amount proportional to a difference between the long-term average received signal qualities of the respective antennas;
wherein the step of selecting one of the antennas is biased in favor of the antenna currently having the best determined long-term average received signal quality.

40. A method according to claim 39, further comprising selecting the antenna receiving the greatest average signal quality when the difference between average received signal quality for respective ones of the antennas exceeds a threshold.

41. A method for selecting an antenna from a plurality of antennas for a receiver selectively operable with the antennas, comprising the steps of:
measuring average received signal quality for respective ones of the antennas;
determining long-term average received signal quality for respective ones of the antennas; and
selecting one of the antennas for subsequent use based in part on the average received signal quality measurements and in part on the determined long term overage received signal quality;
wherein the step of selecting one of the antennas is biased in favor of the antenna currently having the best determined long-term average received signal quality, the method further comprising
selecting one of the antennas in a first mode in accordance with the following relationship:

$$NON\_PREF > PREF + dSIGNAL\_QUALITY * \alpha$$

and in a mode in accordance with the following relationship:

$$NON\_PREF > PREF - dSIGNAL\_QUALITY * \alpha$$

where NON_PREF is the long term overage signal quality received by the antenna towards which selection is not biased, PREF is the long-term average signal quality received by the antenna to which selection is biased, dSIGNAL_QUALITY is the difference between average received signal quality for the antennas, and $\alpha$ is a factor.

42. A method according to claim 41, comprising selecting the first mode if the average received signal quality of both of the antennas is greater than a predetermined threshold above the sensitivity of the receiver, and selecting the second mode if the average received signal quality of both of the antennas is less than the predetermined threshold above the sensitivity of the receiver.

43. Antenna selection apparatus for a receiver selectively operable with a first and a second antenna, comprising:
measurement means for measuring average received signal quality for respective ones of the first and the second antennas;
means for determining long-term average received signal quality for each of respective ones of the first and the second antennas; and
selection means for selecting one of the first or the second antennas for subsequent use based on the average received signal quality measurement of one of the antennas exceeding the average received signal quality measurement of the other of the antennas by an amount proportional to a difference between the long-term average received signal qualities of the respective antennas.

44. A method for selecting an antenna from a plurality of antennas for a receiver selectively operable with the antennas, comprising the steps of:
measuring average received signal quality for respective ones of the antennas;
determining long-term average received signal quality for each of respective ones of the first and the second antennas; and
selecting one of the antennas for subsequent use based on the average received signal quality measurement of one of the antennas exceeding the average received signal quality measurement of the other of the antennas by an amount proportional to a difference between the long-term average received signal qualities of the respective antennas.

* * * * *